INVENTOR.
ERNEST G. H. BARGMEYER
BY Robert J. Patterson
ATTORNEY

United States Patent Office 2,789,933
Patented Apr. 23, 1957

2,789,933

MANUFACTURE OF RUBBER ARTICLES

Ernest G. H. Bargmeyer, Mishawaka, Ind., assignor to United States Rubber Company, New York, N. Y., a corporation of New Jersey Application April 30, 1952, Serial No. 285,131

10 Claims. (Cl. 154—46)

---

This invention relates to new articles of manufacture having a main body portion composed of rubber deposited from latex, typically by a dipping operation, and subsequently cured, and to the method of making such articles. The invention also relates to a new coating composition for use in the production of such articles. More specifically, the invention relates to improvements in the manufacture of so-called "dipped" rubber footwear.

It has been conventional to make dipped rubber goods, particularly footwear, by dipping a suitable form, which is termed a last in the case of footwear, into rubber latex, removing the form with an adhering coating of the latex, coagulating the latex in place, repeating the dipping and coagulation as desired to build up a coagulum of the desired thickness, washing, vulcanizing the built-up deposit of rubber and stripping the vulcanized article from the form.

It has been customary in making dipped rubber products by the above process to apply a material like clay, talc, soapstone or bentonite, usually in the form of a slurry in water or alcohol, to the form before dipping it into the latex. The purpose of this coating of finely divided material was to prevent the cured rubber article from sticking to the form. After the dipping and curing operations, the article was stripped from the form and then cleaned, by washing with water to remove the adhering clay or the like therefrom. The cured article was then generally treated on the side which was next to the form in order to impart a slip and reduce the drag so that the article could be slipped on and off more easily, this being especially important in the case of footwear and gloves. This slip finish was usually imparted by treatment with talc or chlorine solution or by coating with a varnish. In the prior practice it was also necessary to clean off the form after each cycle before beginning a new cycle.

The prior art technique described above was subject to many disadvantages which are overcome by the present invention. The process was unduly complicated, involving an excessive number of steps. The application of the slurry of clay or the like to the form was "messy," and the results were sometimes erratic. The step of washing off the clay also was "messy." The methods of imparting the slip finish were unsatisfactory; thus talc did not give the desired attractive appearance; the chlorine treatment resulted in an uneven and undesirable dulling; the varnishing step was difficult and the varnish was unduly subject to damage, requiring expensive and tedious touching up.

More recently attempts have been made to coat the form or last with an alcoholic solution of nylon with the idea of thereby preventing undue adhesion between the rubber article and the form but it has been found that nylon exhibits such poor adhesion to the built-up rubber article that it is necessary to use special adhesives interposed between the nylon layer and the rubber layer in order to cause the nylon layer to adhere to the rubber article when the latter is stripped from the form.

The principal object of the present invention is to provide a simple and economical method of effecting easy and clean separation of the cured rubber article from the form and at the same time providing a smooth attractive slip finish on the side of the rubber article which was adjacent the form. Another object is to provide as a new article of manufacture a body of rubber deposited from rubber latex and subsequently cured and having tenaciously adhered to the side thereof which was adjacent the form a smooth attractive slip finish formed thereon while the rubber body was being formed. My invention provides on the inside of rubber footwear a finish which is attractive and which also allows the wearer easily to put on and remove the article of rubber footwear over the ordinary leather shoe over which it is worn. Another object of the invention is to reduce the adhesion between the rubber article and the form so as to allow steam and other gases liberated during drying or curing to be vented along the form to the outside atmosphere thereby preventing the blistering which would occur during drying or curing if there were too great a degree of adhesion to the form. Another object is to enable the cured rubber article, such as a rubber shoe, to be easily stripped from the form or last after curing. Another object is to provide a technique which leaves the form or last clean so as to avoid the necessity of expensive cleaning operations before beginning the next cycle. Another object is to accomplish the foregoing objects in a simple and commercially feasible manner. Numerous other objects of the present invention will appear more fully hereinafter.

In the accompanying drawings:

Fig. 1 shows coating a last with the novel coating composition of my invention;

Fig. 2 portrays drying of the coating applied in Fig. 1;

Fig. 3 shows the latex dipping step;

Fig. 4 portrays the vulcanizing step;

Figure 1:
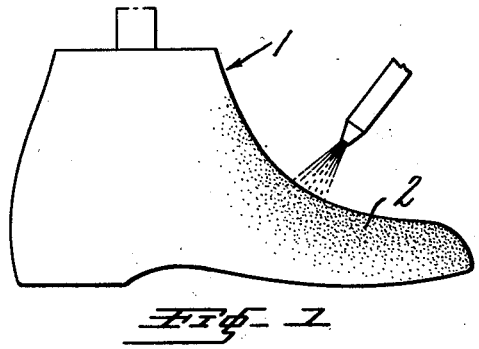

The present invention is based upon my discovery that the foregoing objects can be accomplished and that the disadvantages of prior art practices such as are set forth above can be avoided in a simple and practical manner by applying to the form or last prior to the dipping step a coating composition comprising a selected resin, an unvulcanized rubber compatible therewith and a silicone fluid, all dissolved in a mutual volatile organic solvent, followed by drying to remove the solvent. The thus-coated form is then subjected to the conventional steps of dipping in a rubber latex, coagulating, washing, drying and vulcanizing, after which the vulcanized rubber article is stripped from the form. The invention is based upon my discovery that the particular coating material disclosed herein transfers from the form to the body of cured rubber deposited from the latex, stripping cleanly and easily from the form and giving a smooth, attractive slip finish on the side of the body adjacent the form. Thus, there is no necessity for a cleaning operation to remove the clay or the like on the inside of the rubber article, no necessity for an after-treatment of the surface of the rubber article, such as chlorine treatment or varnishing or lacquering to give a smooth finish next to the form, and there is no necessity for cleaning the form prior to commencement of the next cycle of operations.

To prepare the coating composition, I dissolve the resin, rubber and silicone fluid in a suitable mutual, inert, volatile organic solvent or solvent mixture to form a solution of suitable solids content. I believe this coating composition to be novel. I apply a coating of this composition to the form in any suitable manner, as by spraying or dipping. I then dry the coated form by evaporating the solvent therefrom and then proceed with the dipping and subsequent operations which are conducted in the conventional manner known to the latex dipping art.

In practicing my invention I carefully select the resin used in the coating. The resin employed must of course be compatible with the unvulcanized rubber component of the coating and with the silicone fluid. I have found that not all resins are operable. In fact, I have found that the resin must be selected from the group consisting of styrene-isobutylene resinous copolymers of styrene and isobutylene such as are shown in detail in Smyers U. S. Patent 2,274,749, these copolymers typically containing from 40 to 60% by weight of combined styrene and correspondingly from 60 to 40% of combined isobutylene, resinous copolymers of styrene and butadiene such as are shown in German Patent 588,785 and which typically contain from 70 to 95% by weight of styrene and correspondingly from 30 to 5% of butadiene, and resinous copolymers of styrene and acrylonitrile, typically containing from 50 to 90% by weight of styrene and correspondingly from 50 to 10% by weight of acrylonitrile.

As the rubber component of the coating mixture, I can use any vulcanizable rubber which is compatible with the resin, by which I mean that a mixture of the rubber and resin laid down from solution in a mutual volatile organic solvent is transparent. The rubber used in the coating mixture is usually of the same kind as the rubber in the latex with which the coated form is dipped. In other words, I generally employ the same type of rubber in the body of the rubber article and in the coating. However, I can use one type of rubber in the body and another type in the coating.

Examples of rubbers which can be used in the body or in the coating or in both are natural rubber, particularly Hevea rubber, rubbery copolymers of butadiene and styrene (so-called GR-S), polychloroprene (neoprene), rubbery copolymers of butadiene and acrylonitrile (so-called Buna N or GR-A), and rubbery copolymers of isobutylene and butadiene or isoprene (Butyl). Buna N or neoprene are recommended where gasoline-resistance is desired.

The silicone component of the coating can be any non-resinous, non-volatile, polymeric fluid silicone having a consistency when by itself ranging from an oily liquid to a grease. I generally employ commercial polymeric dimethyl silicone fluids having the formula $$CH_3[(CH_3)_2SiO]_xSi(CH_3)_3$$

where $x$ is 2 to 11. Such silicone fluids are generally mixtures of a predominating amount of one polymer of dimethylsiloxane with minor amounts of other polymers of dimethyl-siloxanes within the range of the above formula. The viscosities of the methyl silicone oils typically range between 0.5 and 1,000 centistokes at 25° C., and the specific gravities typically range from 0.760 to 0.975 at 25° C. Other fluid polymeric silicones than the methyl silicones which may be used in the present invention are the ethyl silicone fluids or polymeric diethylsiloxanes, and the alkyl-aryl silicone fluids, e. g., polymeric methyl phenyl siloxanes and polymeric ethyl phenyl siloxanes. The silicone fluid should be soluble in and compatible with the rubber and resin components of the coating. For further description of silicone fluids reference is made to "Chemistry of the Silicones" by E. G. Rochow, published by John Wiley, N. Y., second edition, 1951, particularly chapter 6 entitled "Properties of the specific silicone polymers" and to two articles by D. C. R. Miller in Canadian Chemistry and Process Industries, vol. 33, pages 764–767, 858–866 and 870.

Suitable polymeric methyl silicone fluids for use in the present invention can be made in accordance with U. S. Patents 2,258,218 to E. G. Rochow, 2,377,689 to Hyde, 2,384,384 to McGregor et al., 2,469,888 to Patnode, and 2,491,843 to Wilcock.

The silicones which are suitable for use in this invention may vary from light oil-like liquids to heavy jellies or greases. Examples are products which are sold by the Dow-Corning Corporation under the designation of "Dow-Corning Stop Cock Grease," "Dow-Corning Plug Cock Grease," "Dow-Corning Type 200 Fluid," "Dow-Corning Type 500 Fluid," "Dow Corning Ignition Sealing Grease," and "Dow-Corning Anti-Foam A."

The silicones employed usually contain from 1.98 to less than 3.0 hydrocarbon radicals per silicon atom, the said hydrocarbon radicals being attached to the silicon atoms by carbon-silicon linkages and being selected from the group consisting of alkyl, aryl, aralkyl and alkaryl radicals, preference being given to the lower alkyl radicals, especially methyl.

Any suitable volatile organic solvent capable of dissolving the resin, rubber and silicone can be used. The solvent can comprise a single material or a mixture of materials. The selection of the solvent will of course depend upon the particular rubber used. In the case of natural rubber, I can employ gasoline or like paraffinic hydrocarbon solvent. Aromatic hydrocarbon solvents such as benzene, toluene and xylene are often preferred because they are more powerful solvents than the paraffin hydrocarbons. Toluene is an especially preferred solvent from the standpoints of solvent power, cost and freedom from toxicity. Methyl ethyl ketone is used as one of the solvents when a styrene-acrylonitrile resin is employed. I can use a chlorinated hydrocarbon solvent such as carbon tetrachloride and thereby reduce the fire hazard. I often prefer to use a mixture of a minor proportion, say 5–25%, of butanol, and a major proportion, say 95–75%, of toluene, the butanol serving to prevent "webbing" during the coating operation. Those skilled in the art will appreciate that the solvent or solvent combination used will be dictated by the particular resin and rubber used in the composition.

The proportion of total solids in the coating composition can vary within quite wide limits depending upon many factors, especially the method of coating. I generally make up the coating composition to a total solids content of from 3 to 15%, using the lower total solids figures for spray application.

Application of a single coating of the mixture in any conventional manner, as by spraying or dipping, will give a film of sufficient thickness to accomplish the objectives of my invention.

The proportions of resin, rubber and silicone usually range from 25 to 90% of the resin and correspondingly from 75 to 10% of the rubber and from 5% to 50% of the silicone, these percentages being by weight based on the sum of the weights of resin and rubber. I prefer however to employ from 50 to 90% of the resin and correspondingly between 50 to 10% of the rubber, and from 10 to 45% of the silicone.

The selection of the resin component is critical. I do not believe that there are now available to the art any resins which will work satisfactorily in my invention and which are sufficiently cheap to be commercially feasible, other than those enumerated above.

Figure 2:
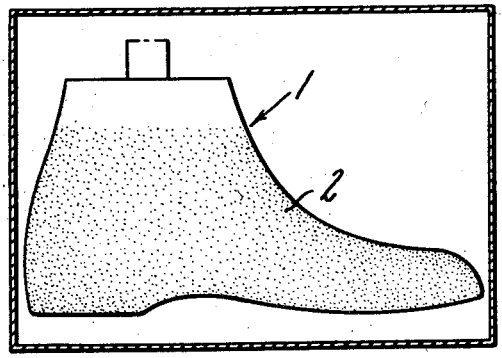
Figure 3:
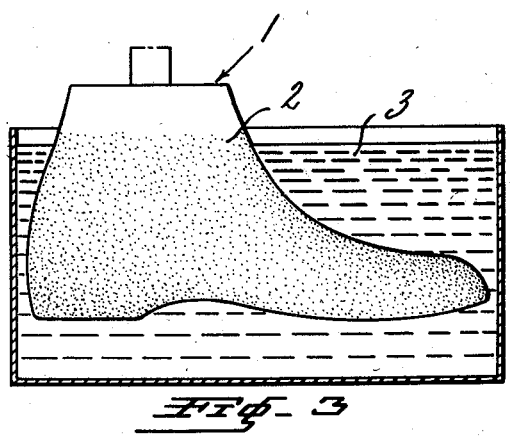
Figure 5:
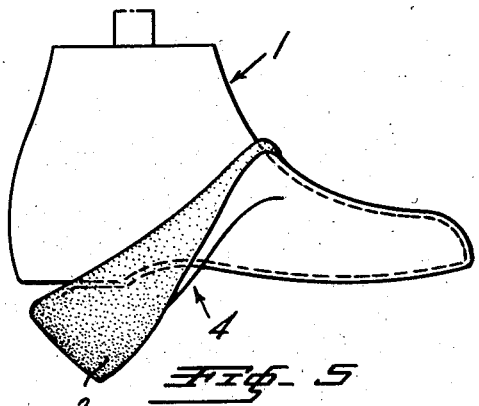
Fig. 5 shows the step of stripping from the last.
Figure 4:
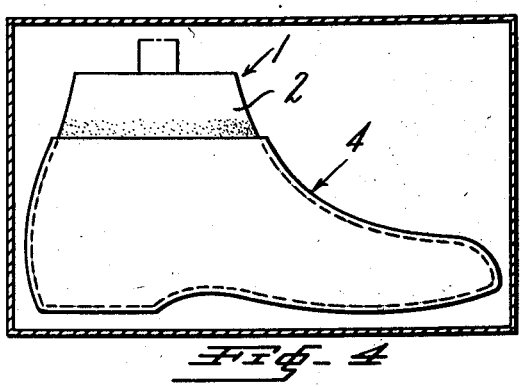
Figure 6:
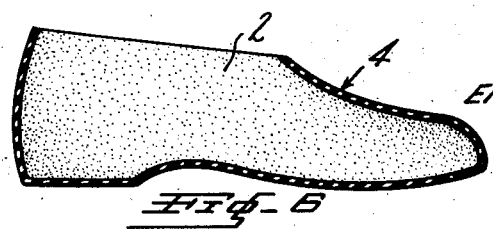
Fig. 6 shows the finished shoe.

In the drawings, a last 1 is sprayed in Fig. 1 with the coating composition of my invention. The coating 2 is dried in any suitable manner as indicated in Fig. 2. The dried coated last is then dipped in bath 3 of rubber latex which is coagulated, washed and dried (steps not shown since conventional), to build up an article 4 of rubber footwear which is now vulcanized as shown in Fig. 4. Then the shoe 4 is stripped from the last 1, as shown in Fig. 5, the coating 2 of my invention adhering tenaciously to the inside of the shoe 4 and separating easily and cleanly from last 1. The excess at the top of the shoe is then trimmed off, to give a shoe as shown in Fig. 6.

The following examples more fully illustrate my in-

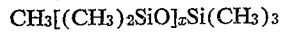

vention. All parts are by weight. The "S-60 Resin" was a styreneisobutylene copolymer containing about 50% of combined styrene. The silicone oil was "Dow-Corning Antifoam A"—a polymeric dimethyl silicone oil which is sold as a 25% solution in toluene; the parts given in the examples refer to the actual silicone oil content. The adhesion referred to was the adhesion to natural rubber when applied thereto before vulcanization, in all all cases except in Example 4 where adhesion to neoprene was also determined.

*Examples 1 to 13*

Coating compositions formulated in accordance with the above teachings were prepared using the specific ingredients in the proportions (by weight) given below. The formulations also contained conventional vulcanizing and other compounding ingredients (including accelerator and antioxidant) appropriate to the particular type of rubber. They also embodied small amounts of appropriate pigmenting and filling materials. In each case except Example 13 the compositions were based on a mixture of a major proportion (about 95%) of toluene as a mutual solvent for the resin, rubber and silicone fluid and a minor proportion (about 5%) of n-butanol. The compositions of Examples 1 to 12 were prepared by banding the resin on an open rubber mill, adding the rubber, appropriate rubber compounding and curing ingredients, pigments and fillers, then dissolving the mixture in the toluene, then adding the silicone fluid and the n-butanol and mixing until thorough solution and dispersion are effected. In each case the mixtures were made up to about 10% total solids.

Each of these coating compositions was applied by spraying upon a last and dried, the last dipped in rubber latex containing curatives, the latex coagulated, washed and dried and the rubber article then vulcanized. The vulcanized article with the coating was then stripped.

The types and proportions of the three main ingredients were:

*Example 1*

| | |
|---|---|
| "S-60 Resin" | 50 |
| Neoprene (Type CG) | 50 |
| Silicone oil | 30 |

This formulation had excellent slip and appearance.

*Example 2*

| | |
|---|---|
| "S-60 Resin" | 83.3 |
| Natural rubber | 16.7 |
| Silicone oil | 33.3 |

This gave good slip.

*Example 3*

| | |
|---|---|
| "Pliolite S-6" (high styrene-low butadiene resin) | 50 |
| Neoprene (Type CG) | 50 |
| Silicone oil | 41.6 |

This gave excellent slip together with good adhesion to the rubber body.

*Example 4*

| | |
|---|---|
| "Goodrite Resin 50" (high styrene-low butadiene resin) | 50 |
| Neoprene (Type CG) | 50 |
| Silicone oil | 33.3 |

When this was applied to both natural rubber and neoprene it gave good adhesion and very good slip properties.

*Example 5*

| | |
|---|---|
| "Goodrite Resin 50" | 50 |
| Pale crepe rubber | 50 |
| Silicone oil | 33.3 |

This gave good adhesion and good slip characteristics.

*Example 6*

| | |
|---|---|
| "Kralac A" (high styrene-low butadiene resin) | 50 |
| Natural rubber | 50 |
| Silicone oil | 33.3 |

This gave both good slip and good adhesion.

*Example 7*

| | |
|---|---|
| "S-60 Resin" | 90 |
| Natural rubber | 10 |
| Silicone oil | 10 |

This gave satisfactory adhesion and excellent slip properties.

*Example 8*

| | |
|---|---|
| "S-60 Resin" | 80 |
| Natural rubber | 20 |
| Silicone oil | 10 |

This gave very good slip and very good adhesion.

*Example 9*

| | |
|---|---|
| "S-60 Resin" | 90 |
| Natural rubber | 10 |
| Silicone oil | 40 |

This also gave very good slip and very good adhesion.

*Example 10*

| | |
|---|---|
| "S-60 Resin" | 90 |
| Natural rubber | 10 |
| Silicone oil | 20 |

This too gave very good slip and very good adhesion.

*Example 11*

| | |
|---|---|
| "S-60 Resin" | 80 |
| Natural rubber | 20 |
| Silicone oil | 20 |

This gave results equal to those of Example 10.

*Example 12*

| | |
|---|---|
| "S-60 Resin" | 80 |
| Natural rubber | 20 |
| Silicone oil | 40 |

This gave good slip and good adhesion.

*Example 13*

| | |
|---|---|
| "Kralac 1129" (high styrene-low acylonitrile resin) | 50 |
| Natural rubber | 50 |
| Silicone oil | 33.3 |

The mutual solvent used was a mixture of equal parts of methyl ethyl keone and toluene which gave a fully compatible solution. This composition gave good adhesion and fair slip.

*Example 14*

Masterbatch A was first prepared according to the following formulation:

*Masterbatch A*

| | |
|---|---|
| Smoked sheets | 60 |
| Benzothiazyl disulfide | 12.5 |
| Diorthotolylguanidine (accelerator) | 2.5 |

Masterbatch B was prepared according to the following formulation:

*Masterbatch B*

| | |
|---|---|
| Smoked sheets | 264 |
| Carbon black | 66 |

Masterbatch C was then prepared according to the following formulation:

*Masterbatch C*

| | |
|---|---|
| Smoked sheets | 49 |
| Masterbatch A | 1.5 |
| "Kalite 1" (calcium carbonate rubber filler) | 6 |
| Zinc carbonate | 5 |
| "Agerite Gel" (rubber anti-oxidant consisting of ditolylamines with a selected petroleum wax) | 0.25 |
| Rosin | 5 |
| Sulfur | 1 |

Masterbatch D was then prepared as follows:

*Masterbatch D*

| | |
|---|---|
| "S–60 Resin" | 20 |
| Masterbatch C | 10 |
| Masterbatch B | 2.25 |

The "S–60 Resin" was banded on the mill after which the masterbatch C was added slowly. The mixture was thoroughly milled and sheeted out.

A final formulation was then prepared as follows:

| | |
|---|---|
| Masterbatch D | 11.3 |
| DC Antifoam A[1] | 4.5 |
| Talc | 11.5 |
| Aerosol OT (dioctyl sodium sulfosuccinate) | 3 |
| n-Butanol | 10 |
| Petroleum hydrocarbon rubber solvent | 214 |

[1] 4.5 parts of the DC Antifoam A 25% solution were used, giving 1.125 parts of actual silicone fluid.

The masterbatch D was cut into the rubber solvent. The Aerosol OT was cut into the n-butanol. Then the DC Antifoam A, the talc and the solution of Aerosol OT in the n-butanol were added to the solution of masterbatch D in the rubber solvent. Mixing was continued until all components were thoroughly dissolved and dispersed.

The final formulation was then applied to a last and allowed to dry to form a thin uniform continuous coating thereon. The resulting last was then dipped in natural rubber latex compounded with conventional rubber vulcanizing ingredients and other compounding ingredients. An article of rubber footwear was then built up upon the last. The resulting assembly was then vulcanized. The shoe was then stripped with the coating deposited from the above formulation adhering tenaciously to the inside thereof. Separation from the last was clean and easy. Upon trimming the top portion of the shoe, there was obtained a shoe having an inside finish of unusually attractive appearance. The inside finish was easy to keep clean and had exactly the right slip characteristics necessary to make it easy to put on and take off, without allowing the shoe to come off the foot in an excessively easy manner while being worn.

While my invention is primarily applicable to footwear, it can be applied to any other dipped rubber article such as gloves, balloons, etc.

As used herein and in the claims appended hereto, by "cured" I mean vulcanized with sulfur or its equivalent. It will be understood that sulfur or its equivalent is used in the case of sulfur-vulcanizable rubber, and that other appropriate vulcanizing agents known to the art are used in the case of rubbers which are not vulcanizable with sulfur, e. g., neoprene. It will be understood from the above description that the rubber content of my coating is vulcanized at the same time as the body of rubber deposited from the latex. The vulcanization of the coating is typically effected by the incorporation therein of conventional vulcanizing ingredients for the rubber content thereof and vulcanization of the entire assembly in the conventional manner. Alternatively, though less preferably, in the case of sulfur-vulcanizable rubbers, I can effect their vulcanization in the coating by reason of unavoidable migration of sulfur or its equivalent (which was incorporated in the latex used for dipping) from the rubber body into the coating during vulcanization of the body of rubber.

The simultaneous vulcanization of both the rubber body and the coating of my invention is highly desirable. It will be seen that my method is far easier and more effective than would be the case if one attempted to apply my coating composition to the already vulcanized rubber body. The latter procedure would involve an excessive number of steps and also would not give the advantages of easy separation of the rubber body from the form and of leaving a clean form ready to be reused immediately; also the degree of adhesion of the coating to the cured rubber body would be much lower than in the case where the coating is applied prior to curing of the rubber body in accordance with the preferred method of my invention.

From the foregoing description it will be seen that my invention provides a simple and commercially feasible method of accomplishing the objectives set out above. Many other advantages of my invention will be readily apparent to those skilled in the art.

Having thus described my invention, what I claim and desire to protect by Letters Patent is:

1. In a method of making dipped rubber articles wherein a form is dipped in a rubber latex and the resulting coating is coagulated and cured, the improvement which comprises coating the form before the dipping with a thin uniform continuous coating consisting essentially of a resin selected from the group consisting of soluble styrene-isobutylene resinous copolymers, styrene-butadiene resinous copolymers and styrene-acrylonitrile resinous copolymers, an unvulcanized rubber compatible with said resin, a non-resinous, non-volatile, polymeric silicone fluid of a consistency ranking from an oily liquid to a grease and selected from the group consisting of dimethyl silicone fluids, diethyl silicone fluids and alkyl-aryl silicone fluids, the proportions of said ingredients in said coating ranging from 25 to 90% of said resin and correspondingly from 75 to 10% of said rubber and from 5 to 50% of said silicone fluid, said percentages being by weight based on the sum of said resin and said rubber, and vulcanizing ingredients for said unvulcanized rubber and after curing stripping the resulting body of rubber with the thin uniform continuous cured coating of said resin, rubber and silicone fluid tenaciously adhering thereto from the form.

2. The method as set forth in claim 1 wherein the proportions of said ingredients in said coating range from 50 to 90% of said resin and correspondingly from 50 to 10% of said rubber, and from 10 to 45% of said silicone fluid, said percentages being by weight based on the sum of said resin and said rubber.

3. In the manufacture of dipped rubber articles wherein a form is dipped in a rubber latex and the resulting coating is coagulated and cured, the improvement which comprises coating the form before the dipping step with a composition consisting essentially of a soluble styrene-isobutylene resinous copolymer, an unvulcanized rubber compatible with said copolymer, and a non-resinous, non-volatile, polymeric silicone fluid of a consistency ranging from an oily liquid to a grease and selected from the group consisting of dimethyl silicone fluids, diethyl silicone fluids and alkyl-aryl silicone fluids, all dissolved in a mutual volatile organic solvent, said composition embodying vulcanizing ingredients for said unvulcanized rubber, the proportions ranging from 50 to 90% of said resinous copolymer and correspondingly from 50 to 10% of said rubber, and from 10 to 45% of said silicone fluid, said percentages being by weight based on the sum of said resinous copolymer and said rubber, evaporating said solvent and thereby forming on the surface of said form a thin uniform continuous coating of an intimate homogeneous mixture of said copolymer, rubber and silicone fluid, and after curing stripping the resulting body of rubber with said coating of said mixture tenaciously adhering thereto from the form.

4. In the manufacture of dipped rubber footwear wherein a last is dipped in a rubber latex and the resulting coating is coagulated and cured, the improvement which comprises coating the last before the dipping step with a composition consisting essentially of a resin selected from the group consisting of soluble styrene-isobutylene resinous copolymers, styrene-butadiene resinous copolymers and styrene-acrylonitrile resinous copolymers, an unvulcanized rubber compatible with said resin, and a non-resinous, non-volatile, polymeric silicone fluid of a consistency ranging from an oily liquid to a grease and selected from the group consisting of dimethyl silicone fluids, diethyl silicone fluids and alkyl-aryl silicone fluids, all dissolved in a mutual volatile organic solvent, the proportions ranging from 50 to 90% of said resin and correspondingly from 50 to 10% of said rubber, and from 10 to 45% of said silicone fluid, said percentages being by weight based on the sum of said resin and said rubber, said composition embodying vulcanizing ingredients for said unvulcanized rubber, evaporating said solvent and thereby forming on the surface of said last a thin uniform continuous coating of an intimate homogeneous mixture of said resin, rubber and silicone fluid, and after curing stripping the cured article with said coating of said mixture tenaciously adhering to the inner surface thereof from the last.

5. A method as set forth in claim 4 wherein said resin is a soluble styrene-isobutylene resinous copolymer.

6. A new article of manufacture comprising a cured body of a rubber deposited from latex, said body having tenaciously adhered to one face thereof a thin uniform continuous smooth cured slip finish coating consisting essentially of a resin selected from the group consisting of soluble styrene-isobutylene resinous copolymers, styrene-butadiene resinous copolymers and styrene-acrylonitrile resinous copolymers, a rubber compatible with said resin, and a non-resinous, non-volatile, polymeric silicone fluid of a consistency ranging from an oily liquid to a grease and selected from the group consisting of dimethyl silicone fluids, diethyl silicone fluids and alkyl-aryl silicone fluids, in proportions of from 25 to 90% of said resin and correspondingly from 75 to 10% of said rubber, and from 5 to 50% of said silicone fluid, said percentages being by weight based on the sum of said resin and said rubber.

7. A new article of manufacture comprising a cured body of a rubber deposited from latex, said body having tenaciously adhered to one face thereof a thin uniform continuous smooth cured slip finished coating consisting essentially of a resin selected from the group consisting of soluble styrene-isobutylene resinous copolymers, styrene-butadiene resinous copolymers and styrene-acrylonitrile resinous copolymers, a rubber compatible with said resin, and a non-resinous, non-volatile, polymeric silicone fluid of a consistency ranging from an oily liquid to a grease and selected from the group consisting of dimethyl silicone fluids, diethyl silicone fluids and alkyl-aryl silicone fluids, in proportions of from 50 to 90% of said resin and correspondingly from 50 to 10% of said rubber, and from 10 to 45% of said silicone fluid, said percentages being by weight based on the sum of said resin and said rubber.

8. A new article of manufacture comprising a cured body of a rubber deposited from latex, said body having tenaciously adhered to one face thereof a thin uniform continuous smooth cured slip finish coating of an intimate homogeneous mixture consisting essentially of a soluble styrene-isobutylene resinous copolymer, a rubber compatible with said resinous copolymer, and a non-resinous non-volatile, polymeric silicone fluid of a consistency ranging from an oily liquid to a grease and selected from the group consisting of dimethyl silicone fluids, diethyl silicone fluids and alkyl-aryl silicone fluids, in proportions of from 50 to 90% of said resinous copolymer and correspondingly from 50 to 10% of said rubber, and from 10 to 45% of said silicone fluid, said percentages being by weight based on the sum of said resin and said rubber.

9. An article of rubber footwear comprising a cured body portion of a rubber deposited from latex, said body portion having tenaciously adhered to the inner face thereof a thin uniform continuous smooth cured slip finish coating of an intimate homogeneous mixture consisting essentially of a resin selected from the group consisting of soluble styrene-isobutylene resinous copolymers, styrene-butadiene resinous copolymers, and styrene-acrylonitrile resinous copolymers, a rubber compatible with said resin, and a non-resinous, non-volatile, polymeric silicone fluid of a consistency ranging from an oily liquid to a grease and selected from the group consisting of dimethyl silicone fluids, diethyl silicone fluids and alkyl-aryl silicone fluids, in proportions of from 50 to 90% of said resin and correspondingly from 50 to 10% of said rubber, and from 10 to 45% of said silicone fluid, said percentages being by weight based on the sum of said resin and said rubber.

10. An article of rubber footwear comprising a cured body portion of a rubber deposited from latex, said body portion having tenaciously adhered to the inner face thereof a thin uniform continuous smooth cured slip finish coating of an intimate homogeneous mixture consisting essentially of a soluble styrene-isobutylene resinous copolymer, a rubber compatible with said resinous copolymer, and a non-resinous, non-volatile, polymeric silicone fluid of a consistency ranging from an oily liquid to a grease and selected from the group consisting of dimethyl silicone fluids, diethyl silicone fluids and alkyl-aryl silicone fluids, in proportions of from 50 to 90% of said resinous copolymer and correspondingly from 50 to 10% of said rubber and from 10 to 45% of said silicone fluid, said percentages being by weight based on the sum of said resinous copolymer and said rubber.

References Cited in the file of this patent

UNITED STATES PATENTS

| | | |
|---|---|---|
| 1,867,879 | Crockett | July 19, 1932 |
| 1,994,317 | Linscott | Mar. 12, 1935 |
| 2,472,495 | Sparks et al. | June 2, 1949 |
| 2,491,525 | Sparks et al. | Dec. 20, 1949 |
| 2,494,329 | Carlin | Jan. 10, 1950 |
| 2,547,694 | Dosmann | Apr. 3, 1951 |

FOREIGN PATENTS

| | | |
|---|---|---|
| 601,224 | Great Britain | Apr. 30, 1948 |
| 601,226 | Great Britain | Apr. 30, 1948 |